INVENTORS
JOHN M. WINSTON
LOTHROP M. FORBUSH
BY
THEIR ATTORNEY

Feb. 9, 1960   J. M. WINSTON ET AL   2,924,307
BRAKE ADJUSTING DEVICE
Filed Sept. 27, 1956                       2 Sheets-Sheet 2
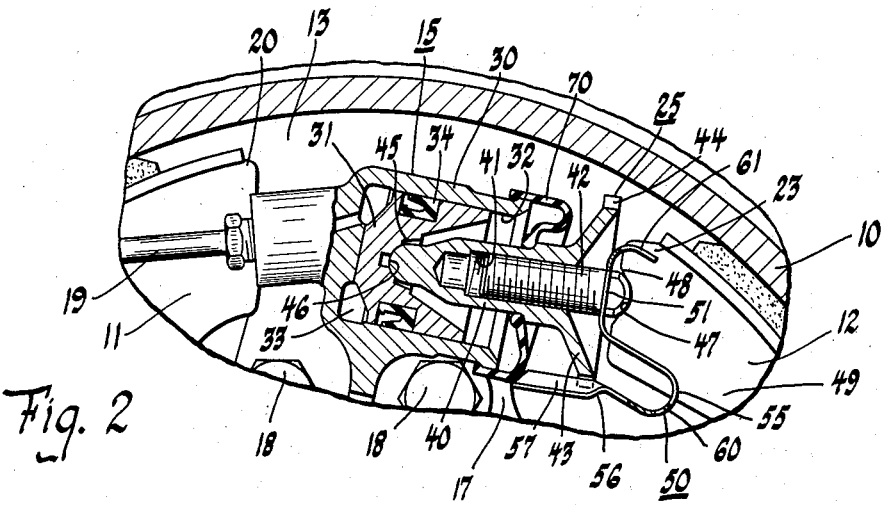
Fig. 2
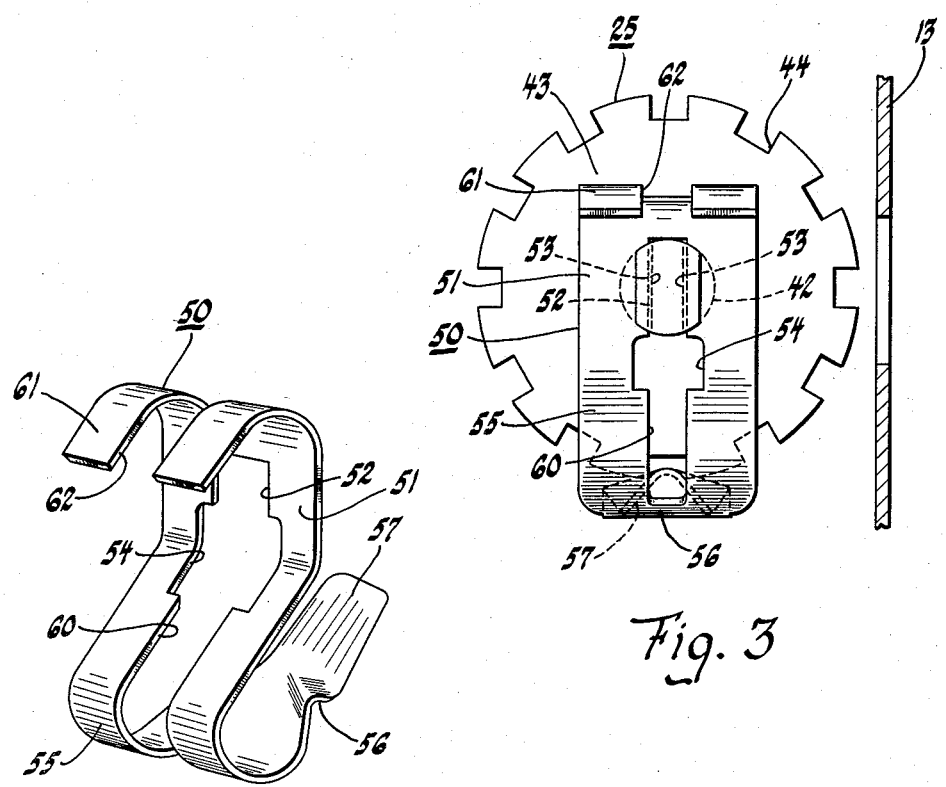
Fig. 3
Fig. 4
INVENTORS
JOHN M. WINSTON
LOTHROP M. FORBUSH
BY
*[signature]*
THEIR ATTORNEY

United States Patent Office 2,924,307
Patented Feb. 9, 1960

2,924,307

BRAKE ADJUSTING DEVICE

John M. Winston, Birmingham, and Lothrop M. Forbush, Ferndale, Mich., assignors to General Motors Corporation, Detroit, Mich., a corporation of Delaware Application September 27, 1956, Serial No. 612,554

7 Claims. (Cl. 188—196)

This invention relates to an adjusting device for a brake for adjusting the relationship between the brake shoes and the brake drum.

An object of the invention is to provide a self-contained brake shoe adjusting device that will provide for small incremental adjustment movements of the brake shoes relative to the brake drum.

Further objects and advantages of the present invention will be apparent from the following description, reference being had to the accompanying drawings wherein a preferred form of the invention is clearly shown.

In the drawings:

Figure 2 is an enlarged cross sectional view of the adjusting device and cooperating hydraulic wheel cylinder.

Figure 3 is an end view of the adjusting device as looking from the right hand end of the device of Fig. 2.

Figure 4 is a perspective elevational view of the detent member for the adjusting device.

Figure 1:
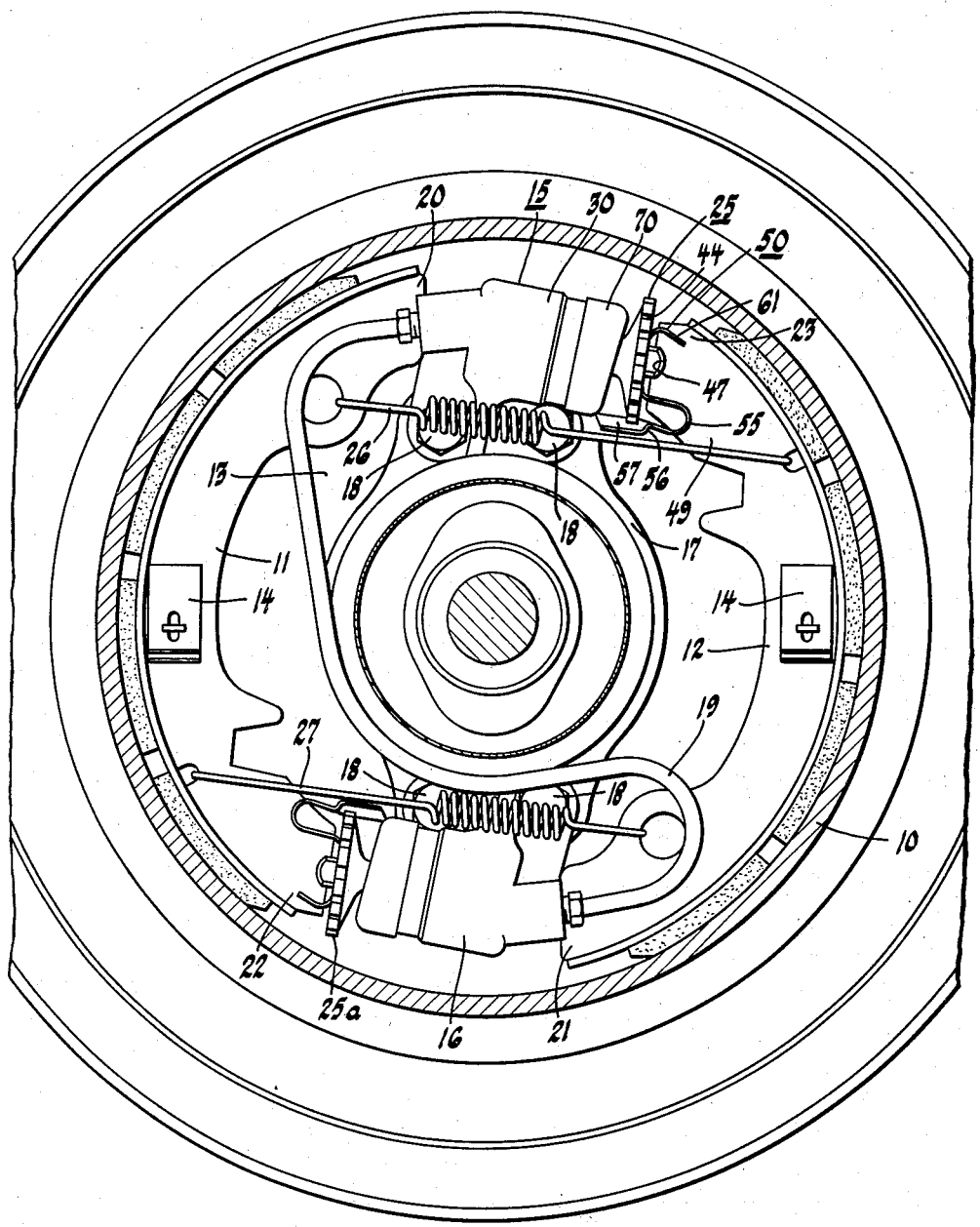
Figure 1 is an elevational view of a brake incorporating the device of this invention.

In this invention the brake consists of a brake drum 10 within which there is positioned a pair of brake shoes 11 and 12. The brake shoes are supported upon the backing plate 13 at spaced intervals with the spring members 14 retaining the shoes upon the backing plate. Hydraulic wheel cylinders 15 and 16 are secured to the support member 17 by means of bolts 18, which support member also carries the backing plate 13.

The wheel cylinders receive hydraulic fluid from a master cylinder of a hydraulic brake system in conventional manner, the wheel cylinders being interconnected by the hydraulic line 19 whereby both of the wheel cylinders operate simultaneously.

The ends 20 and 21 of the brake shoes 11 and 12 respectively engage the wheel cylinders 15 and 16 respectively whereby the wheel cylinders form the anchor for the respective brake shoes 20 and 21. The opposite ends 22 and 23 respectively of the brake shoes 11 and 12 engage the adjusting devices 25 and 25a whereby the shoes can be adjusted relative to the brake drum 10.

Retraction springs 26 and 27 retain the brake shoes 11 and 12 in engagement with the wheel cylinders as anchors and with the adjusting devices 25 and 25a.

Since the wheel cylinders 15 and 16 and the cooperating adjusting devices 25 and 25a are identical in construction, only one of them is illustrated, as for example in Figure 2.

As more particularly shown in Figure 2, the wheel cylinder 15 comprises a cylinder body 30 that has a piston 31 therein reciprocable in the cylinder bore 32. The chamber 33 receives hydraulic fluid from the master cylinder through the hydraulic line 19. A seal 34 prevents loss of hydraulic fluid from the chamber 33.

The adjusting device 25 consists of a cylindrical body 40 that has an internal threaded bore 41 that receives a threaded screw 42. The body 40 has a radial flange 43 that has the serrations 44 in the peripheral edge of the flange 43.

The piston 31 has a recess 45 that forms a seat for the rounded head 46 on the cylindrical body 40 of the adjusting device. The end of te screw 42 that projects from the body 40 has a rounded end 47 that seats in a rounded notch 48 provided in the web 49 of the brake shoe 12. The assembly of the body 40 and the screw 42 provides an adjustable length strut between the piston 31 and the brake shoe 12 to effect adjustment of the brake shoe relative to the drum 10.

To prevent uncontrolled rotation of the screw 42 relative to the body 40, a detent member 50 is provided on the screw 42 and engages the web 49 of the brake shoe 12 to prevent rotation of the screw 42 relative to the shoe 12, and also to resist rotation of the body 40 relative to the screw 42.

The detent member 50 has a flat portion 51 that has a slot 52 therein that is received in notches 53 provided on diametrically opposite sides of the end of the screw 42 whereby the detent member 50 is non-rotatably carried on the screw 42. The slot 52 in the detent member includes an enlarged portion 54 to receive the screw when placing the detent member upon the screw. The detent member 50 also includes a generally U shaped portion 55 that is contiguous with the flat portion 51 and extends from one end of the flat portion. This U shaped portion 55 has an extending free end 56 that forms a resilient arm that engages the serrations 44 in the edge of the flange 43 of the body 40, the extending end 56 having a V shaped end 57 that specifically engages the serrations 44, as shown in Figures 2 and 3, to resist uncontrolled rotation of the body 40 relative to the screw 42, but to permit the body to be manually rotated relative to the screw and therefore permit manual length adjustment.

The U shaped portion 55 of the detent 50 is also provided with a slot 60 that receives the web 49 of the shoe 12 whereby the detent is held from rotation relative to the shoe 12, and thereby prevents rotation of the screw 42 relative to the shoe 12.

The upper end of the flat portion 51 has an extended portion 61 that has a notch 62 that also receives the web 49 to aid in preventing rotation of the detent 50 relative to the shoe 12.

When the detent 50 is assembled on the end of the screw 42 and the screw is then threaded into the bore 41 of the body 40, the screw, the detent and the body become a unitary assembly that can be placed between the piston 31 of the wheeel cylinder 15 and the web 49 of the brake shoe 12. While the adjusting device 25 is specifically illustrated as being placed between a wheel cylinder and a brake shoe, it will be appreciated that the adjusting device can also be used between two adjacent ends of the brake shoes when the brake is of the duo-servo type having a wheel cylinder between two cooperating adjacent ends of the brake shoes with the adjusting device placed between the opposite cooperating adjacent ends of the brake shoes.

The position of the serrations 44 in the edge of the flange 43 of the body 40 is such as to permit manual length adjustment of the adjusting device 25 by conventional means; i.e. a small opening (not shown) in the backing plate 13 may be uncovered, and an adjusting tool inserted through the hole, and the body 40 of the adjusting device then rotated by engaging the tool with the serrations 44, forcing the detent end 57 of the detent member to slide out of one serration to the next as many times as required.

A rubber boot 70 is placed between the wheel cylinder 15 and the body 40 to prevent entry of dirt into the wheel cylinder 15.

While the form of embodiment of the invention as herein disclosed constitutes a preferred form, it is to be understood that other forms might be adopted as may come within the scope of the claims which follow.

What is claimed is as follows:

1. In a brake assembly, a self-locking brake shoe adjuster comprising a threaded screw, a body member having a threaded bore receiving said threaded screw, one end of said body adapted for seating on a hydraulic brake actuating piston and the projecting end of said screw adapted for seating on a cooperative adjacent end of a brake shoe, said body having a radial flange with a serrated edge for rotation of the body relative to the screw to effect contraction or extension of the brake shoe adjuster, a detent member non-rotatably carried on the end of the screw seating on the screw, said detent member having a generally U shaped portion provided with a slot which is adapted for receiving the web of the shoe to prevent rotation of the detent member relative to the shoe and thereby prevent rotation of the screw relative to the shoe.

2. A brake adjusting device for use in combination with a brake comprising a threaded screw, a body member having a threaded bore receiving said threaded screw, one end of said body adapted for cooperation with a brake actuating means and the projecting end of said screw seating on the cooperative adjacent end of a brake shoe, said body having a radial flange with a serrated edge, a sheet metal detent member having a flat portion provided with a slot the edges of which are received in grooves on the projecting end of the screw to non-rotatably support the detent member on the screw, a generally U shaped portion contiguous with the flat portion of the detent member and angular thereto, said U shaped portion having a free end forming a resilient arm engaging said serrations in said flange to resist relative rotation of the body and the screw and having a slot adapted for receiving the web of the shoe to prevent rotation of the detent member relative to the shoe and thereby rotation of the screw relative to the shoe.

3. In a brake having a brake drum and a pair of brake shoes operatively cooperative with the drum with the shoes positioned with ends in adjacent cooperative relationship, a shoe adjusting mechanism for use between the adjacent ends of the shoes, comprising, a cylindrical body member having an internally threaded bore therein and provided with a flange on one end having a serrated edge, a threaded screw member received in said bore, said body and screw forming an adjustable strut adapted for positioning between the adjacent ends of the shoes for adjustment of the shoes relative to the drum upon relative rotation of the body and the screw, grooves in diametrically opposite sides of said screw at the projecting end thereof, a sheet metal detent member having a flat portion provided with a slot the edges of which are received in said grooves in said screw whereby to carry said detent member on said screw non-rotatable thereon, said detent member also having a generally U shaped portion contiguous with the flat portion and angular thereto with a free end of the U shaped portion forming a resilient arm engaging said serrations to resist relative rotation of the body and the screw, said U shaped portion also having a slot adapted to receive the web of the shoe to prevent rotation of the detent member relative to said shoe and thereby prevent rotation of said screw relative to the shoe.

4. In a brake having a brake drum and a pair of brake shoes operatively cooperative with the drum with the shoes positioned with ends in adjacent cooperative relationship, a shoe adjusting mechanism for use between the adjacent ends of the shoes, comprising, a cylindrical body member having an internally threaded bore therein and provided with a flange on one end having a serrated edge, a threaded screw member received in said bore, said body and screw forming an adjustable strut adapted for positioning between the adjacent ends of the shoes for adjustment of the shoes relative to the drum upon relative rotation of the body and the screw, grooves in diametrically opposite sides of said screw at the projecting end thereof, a sheet metal detent member having a flat portion provided with a slot the edges of which are received in said grooves in said screw whereby to carry said detent member on said screw non-rotatable thereon, said detent member also having a generally U shaped portion contiguous with the flat portion and angular thereto with a free end of the U shaped portion forming a resilient arm engaging said serrations to resist relative rotation of the body and the screw, said U shaped portion also having a slot adapted to receive the web of the shoe to prevent rotation of the detent member relative to said shoe and thereby prevent rotation of said screw relative to the shoe, said detent member also having a portion projecting angular from the flat portion at a side thereof opposite to that from which the U shaped portion extends, said last mentioned portion having a slot for receiving the web of the shoe.

5. A brake adjusting device in a vehicle brake comprising, a screw member, a body member having a threaded bore receiving said screw member, one end of said body adapted for cooperation with a brake actuating piston, a projecting end of said screw member adapted for seating on the adjacent end of a brake shoe, said body member having a radial flange with a serrated edge, a detent member nonrotatably secured on the projecting end of said screw member, said detent member including a resilient arm having a limited length for engaging said serrations to resist rotation between said screw member relative to said body member and having an extended portion adapted for engaging the web of the shoe to prevent rotation of said screw relative to the brake shoe and the detent member, said resilient arm having a limited length to disengage contact with said serrated portions of said body member upon a predetermined extension of said brake adjusting device.

6. A brake adjusting device for use in a vehicle brake comprising, a screw member, a body member having a threaded bore receiving said screw member, one end of said body member adapted for engagement with a hydraulic actuating means, the projecting end of said screw member adapted for seating on a cooperative adjacent end of a brake shoe, said body member having a radial flange with a serrated edge, a detent member having a generally S-shaped structure and a first portion supporting the detent member on the screw member, said detent member adapted for engaging said brake shoe and arranged for nonrotation of said screw member and said detent member relative to the cooperative adjacent end of said brake shoe, said supporting portion having a longitudinal slot for reception of said screw member, a second portion having a generally U-shaped arrangement contiguous with the first portion and angular thereto with the free end of the U-shaped portion forming a resilient arm engaging the serrations of said flange of said body member to resist rotation of the body member relative to the screw member.

7. A brake adjusting device for use in combination with a vehicle brake comprising, a screw member, a body member having a threaded bore for receiving said screw member, one end of said body member adapted for cooperation with an actuating hydraulic piston, a projecting end of said screw member adapted for seating on a cooperative adjacent end of a brake shoe, said body member having a radial flange with a serrated edge, a sheet metal detent member having an S-shaped structure and a first portion provided with a longitudinal slot means for reception of the projecting end of said screw member and adapted to maintain a nonrotative attachment of said detent member and said screw member with the cooperative adjacent end of said brake shoe, a generally U-shaped second portion contiguous with said first portion and angular thereto having a free end forming a resilient arm of limited length for engaging said serrations on said radial flange of said body member to resist relative rotation of said body member relative to said screw member, said U-shaped portion having a slot means adapted for reception of the web of said brake shoe to prevent rotation of said detent member relative to said shoe, said limited length of said resilient arm of said detent member providing an engagement of said resilient arm with said serrated edge of said body member only for a predetermined length of extension of said brake adjusting device.

References Cited in the file of this patent

UNITED STATES PATENTS

| | | |
|---|---|---|
| 2,303,699 | Main | Dec. 1, 1942 |
| 2,502,948 | House et al. | Apr. 4, 1950 |
| 2,536,410 | Anderson | Jan. 2, 1951 |
| 2,645,312 | Chase | July 14, 1953 |
| 2,792,084 | Mossey | May 14, 1957 |
| 2,822,892 | Clark | Feb. 11, 1958 |